United States Patent
Matsumoto

(10) Patent No.: US 9,217,051 B2
(45) Date of Patent: Dec. 22, 2015

(54) RESIN PARTICLES, METHOD FOR PRODUCING THE RESIN PARTICLES, AND USE THEREOF

(75) Inventor: Satoru Matsumoto, Koka (JP)

(73) Assignee: Sekisui Plastics Co., Ltd., Osaka-shi (JP)

( * ) Notice: Subject to any disclaimer, the term of this patent is extended or adjusted under 35 U.S.C. 154(b) by 0 days.

(21) Appl. No.: 14/344,124

(22) PCT Filed: Sep. 28, 2011

(86) PCT No.: PCT/JP2011/072265
§ 371 (c)(1),
(2), (4) Date: Mar. 11, 2014

(87) PCT Pub. No.: WO2013/046374
PCT Pub. Date: Apr. 4, 2013

(65) Prior Publication Data
US 2014/0350171 A1    Nov. 27, 2014

(51) Int. Cl.
*C08F 220/06* (2006.01)
*C08F 220/10* (2006.01)
*C08F 236/20* (2006.01)
*C08F 222/10* (2006.01)
*C08F 220/18* (2006.01)
*C09D 147/00* (2006.01)
*C09D 133/06* (2006.01)

(52) U.S. Cl.
CPC ............. *C08F 236/20* (2013.01); *C08F 220/18* (2013.01); *C08F 222/1006* (2013.01); *C09D 133/06* (2013.01); *C09D 147/00* (2013.01)

(58) Field of Classification Search
CPC ............................ C08F 236/20; C09D 147/00
USPC ....................................................... 524/559
See application file for complete search history.

(56) References Cited

FOREIGN PATENT DOCUMENTS

| | | | | |
|---|---|---|---|---|
| JP | 05-156171 A | 6/1993 | | |
| JP | 2000-186017 A | 7/2000 | | |
| JP | 2000186017 A | * 7/2000 | ............... | A61K 7/02 |
| JP | 2002-265620 A | 9/2002 | | |
| JP | 2004-099700 A | 4/2004 | | |
| JP | 2004099700 A | * 4/2004 | ........... | C09D 133/00 |
| JP | 2008-239785 A | 10/2008 | | |
| JP | 2010-215764 A | 9/2010 | | |
| JP | 2010215764 A | * 9/2010 | | |
| JP | 2011-153217 A | 8/2011 | | |

OTHER PUBLICATIONS

International Search Report dated Oct. 25, 2011, issued for PCT/JP2011/072265.

* cited by examiner

*Primary Examiner* — Hui Chin
(74) *Attorney, Agent, or Firm* — Locke Lord LLP

(57) ABSTRACT

The present invention provides resin particles including polymer obtained of a monomer mixture containing a monofunctional (meth)acrylic ester monomer, a monomer represented by a general formula (I);

$$CH_2=C(R_1)-COO-(CH_2CH_2O)_n-CO-C(R_1)=CH_2 \quad (I)$$

where $R_1$ is a hydrogen or a methyl group and n is an integer from 1 to 4, and a monomer represented by a general formula (II);

$$CH_2=C(R_2)-COO-(CH_2CH_2O)_m-CO-C(R_2)=CH_2 \quad (II)$$

where $R_2$ is a hydrogen or a methyl group and m is an integer from 5 to 15. The resin particles have a volume average particle diameter of 5 to 50 μm, a recovery rate of 15% or more to less than 30%, and a compression strength (MPa) that provides a multiplication product in the range of 24.5 to 60.0 obtained by multiplying the compression strength and the volume average particle diameter (μm).

9 Claims, No Drawings

RESIN PARTICLES, METHOD FOR PRODUCING THE RESIN PARTICLES, AND USE THEREOF

TECHNICAL FIELD

The present invention relates to resin particles with a recovery rate of 15% or more and less than 30%, and a method for producing the resin particles. The present invention also relates to a coating material composition containing resin particles with a recovery rate of 15% or more and less than 30%, and an optical film with a coating film including the coating material composition. Furthermore, the present invention relates to an external preparation including the resin particles with a recovery rate of 15% or more and less than 30%.

BACKGROUND ART

Some automobile interior parts are finished with matte coating. A coating material blended with particles (for example, a coating material blended with inorganic particles such as silica and talc, or resin particles such as acrylic resin particles, urethane resin particles, nylon resin particles, silicone resin particles and polyethylene resin particles) is used for such matte coating finishing. A coating film obtained from the coating material blended with such particles can cause the particles existing on the surface to moderately diffuse and reflect incident light and to reduce the gross.

Incidentally, hardness of the particles affects a touch feeling and scratchability of the coating film obtained from the coating material blended with the particles. For example, inorganic particles such as silica and talc are hard, and the coating film obtained from the coating material blended with such hard particles has a hard touch feeling and is easily scratched when impact is applied thereto from the outside. On the other hand, the resin particles are softer than the inorganic particles, and the coating film obtained from the coating material blended with such soft particles has a soft touch feeling (soft feel properties) and high elasticity, and is hardly scratched when impact is applied thereto from the outside.

Accordingly, in recent years, soft resin particles that can provide an excellent scratch resistance to a coating film are being developed.

For example, soft resin particles with a low compression strength, specifically, with a compression strength at the time of 10% compression deformation in the range of 0.01 to 0.6 kgf/mm² (0.1 MPa to 5.88 MPa) are disclosed in Patent Documents 1 to 5.

PRIOR ART DOCUMENT

Patent Document

Patent Document 1: JP 2000-186017A
Patent Document 2: JP 2002-265620A
Patent Document 3: JP 2004-99700A
Patent Document 4: JP 2008-239785A
Patent Document 5: JP 2010-215764A

SUMMARY OF INVENTION

Problems to be Solved by the Invention

However, the resin particles disclosed in Patent Documents 1 to 3 have a low recovery rate after compression deformation (merely referred to as a recovery rate hereinafter) that is less than 15%, and therefore, they cannot provide a sufficient scratch resistance to a coating film.

On the other hand, resin particles disclosed in Patent Documents 4 and 5 have a recovery rate of 15% or more, and have an excellent effect of providing a scratch resistance to a coating film in comparison with the resin particles disclosed in Patent Documents 1 to 3.

However, in spite of a high recovery rate of 15 to 30%, the resin particles disclosed in Patent Document 4 do not have a sufficient solvent resistance. Therefore, the resin particles disclosed in Patent Document 4 is unsuitable for a coating material blended with a large amount of a solvent.

Moreover, in spite of a sufficient solvent resistance, the resin particles disclosed in Patent Document 5 have a high recovery rate of 30 to 40%, and therefore, they cannot provide a scratch resistance to a coating film containing a binder resin with the extremely low recovery rate in comparison with the resin particles. That is, the resin particles disclosed in Patent Document 5 have a high recovery rate of 30 to 40%, and can provide an excellent scratch resistance to a coating film containing a binder resin with the similar recovery rate to the resin particles, but cannot provide a sufficient scratch resistance to a coating film containing a binder resin with the extremely low recovery rate in comparison with the resin particles.

Accordingly, the present invention was made in view of the above circumstances, and it is an object thereof to provide soft resin particles with a recovery rate in the range of 15% or more and less than 30% and excellent solvent resistance, a method for producing the resin particles, and uses of the resin particles.

Means for Solving the Problems

Resin particles of the present invention is resin particles including polymer of a monomer mixture containing a monofunctional (meth)acrylic ester monomer, a monomer represented by a general formula (I);

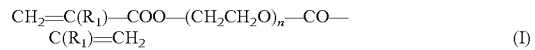

where $R_1$ is a hydrogen or a methyl group and n is an integer from 1 to 4, and a monomer represented by a general formula (II);

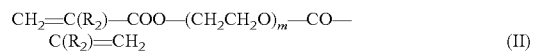

where $R_2$ is a hydrogen or a methyl group and m is an integer from 5 to 15, wherein the monomer mixture contains 65.0 to 85.0 parts by weight of the monofunctional (meth) acrylic ester monomer, 0.5 to 5.0 parts by weight of the monomer represented by the general formula (I), and 10.0 to 30.0 parts by weight of the monomer represented by the general formula (II) with respect to 100 parts by weight of the total amount of the monofunctional (meth)acrylic ester monomer, the monomer represented by the general formula (I), and the monomer represented by the general formula (II), and the resin particles have a volume average particle diameter of 5 to 50 μm, a recovery rate of 15% or more and less than 30%, and a compression strength (MPa) at the time of 10% compression deformation that provides a multiplication product in the range of 24.5 to 60.0 obtained by multiplying the compression strength and the volume average particle diameter (μm). It should be noted that, in this specification, "(meth)acrylic" refers to methacrylic or acrylic.

Such resin particles of the present invention is soft particles with a volume average particle diameter of 5 to 50 μm, a recovery rate of 15% or more and less than 30%, and a compression strength (MPa) at the time of 10% compression deformation that provides a multiplication product in the range of 24.5 to 60.0 obtained by multiplying the compression strength and the volume average particle diameter (μm), and can provide an excellent scratch resistance to a coating film. Furthermore, the resin particles of the present invention contain a component derived from the monomer represented by the above general formula (I), and therefore, a sufficient solvent resistance thereof is secured in a state that a recovery rate of 15% or more and less than 30% is secured.

Moreover, a method for producing resin particles of the present invention is a method for producing the above-described resin particles of the present invention, and the method includes a step of subjecting the monomer mixture to suspension polymerization in an aqueous medium.

This method can produce the above-described resin particles of the present invention at a low cost.

Moreover, a coating material composition of the present invention includes the above-described resin particles of the present invention.

This coating material composition of the present invention contains the resin particles of the present invention capable of providing an excellent scratch resistance to a coating film, and therefore, a coating film with an excellent scratch resistance can be formed.

Moreover, an optical film of the present invention includes a substrate film and a coating film containing the above-described coating material composition of the present invention, the coating film being formed on at least one surface of the substrate film.

In this optical film of the present invention, a coating film including the coating material composition containing the above-described resin particles of the present invention, specifically, soft resin particles with an average particle diameter of 5 to 50 μm is formed on at least one surface of a substrate film, and the optical film has good light diffusion properties. Additionally, the surface on which the coating film is formed has an excellent scratch resistance.

Moreover, an external preparation of the present invention includes the above-described resin particles of the present invention.

This external preparation of the present invention contains the above-described resin particles of the present invention, specifically, soft resin particles with an average particle diameter of 5 to 50 μm, and therefore, it has a soft touch feeling.

Effects of the Invention

With the present invention, it is possible to provide soft resin particles with a recovery rate in the range of 15% or more and less than 30% and excellent solvent resistance, a method for producing the resin particles, a coating material composition containing the resin particles, an optical film with a coating film including the coating material composition, and an external preparation containing the resin particles.

MODES FOR CARRYING OUT THE INVENTION

As a result of intensive studies for the above problems, the present inventors found that resin particles including polymer of a monomer mixture containing a monofunctional (meth) acrylic ester monomer, a monomer represented by a general formula (I);

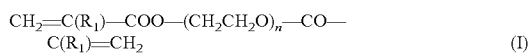

where $R_1$ is a hydrogen or a methyl group and n is an integer from 1 to 4, and a monomer represented by a general formula (II);

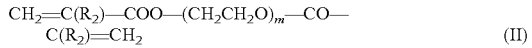

where $R_2$ is a hydrogen or a methyl group and m is an integer from 5 to 15 in a predetermined ratio, the resin particles having a volume average particle diameter of 5 to 50 μm, a recovery rate of 15% or more and less than 30%, and a compression strength (MPa) at the time of 10% compression deformation that provides a multiplication product in the range of 24.5 to 60.0 obtained by multiplying the compression strength and the volume average particle diameter (μm), are soft particles with an excellent solvent resistance and capable of providing an excellent scratch resistance to a coating film, and thus, the present invention has been achieved.

Features of the resin particles of the present invention will be specifically described hereinafter.

Resin Particles of the Present Invention

First, the resin particles of the present invention have a volume average particle diameter of 5 to 50 μm, and more preferably 7 to 35 μm. Such resin particles with a volume average particle diameter in the range of 5 to 50 μm can be blended into a coating material to enhance matte properties and finished appearances of a coating film obtained from the coating material. Conversely, resin particles with a volume average particle diameter of less than 5 μm may not form sufficiently large unevenness in a coating film and provide matte properties to the coating film. Moreover, resin particles with a volume average particle diameter of more than 50 μm may cause appearances of a coating film to be rough, and deteriorate finished appearances of the coating film. It should be noted that, in this specification, "a volume average particle diameter" refers to a volume average particle diameter obtained by a measurement method described in the section of Examples below.

Furthermore, the resin particles of the present invention have a recovery rate of 15% or more and less than 30%, more preferably 15% or more and 25% or less, and even more preferably 15% or more and 20% or less. When the resin particles with a recovery rate of less than 15% are blended into a coating material, the scratch resistance of a coating film obtained from the coating material may be reduced. When the resin particles with a recovery rate of 30% or more are contained in a coating film together with a binder resin with a relatively low recovery rate (e.g., recovery rate of approximately 20% or less), recovery properties thereof at the time after a load is applied to the coating film and the coating film is deformed together with the binder resin are much higher than those of the binder resin, so that it is likely to leave scars on the surface of the coating film. That is, when the resin particles with a recovery rate of 30% or more are contained in a coating film together with a binder resin with a relatively low recovery rate, the scratch resistance of a coating film may be reduced. It should be noted that, in this specification, "a recovery rate" refers to a recovery rate obtained by a measurement method described in the section of Examples below.

Additionally, the resin particles of the present invention have a compression strength (MPa) at the time of 10% compression deformation that provides a multiplication product in the range of 24.5 to 60.0, and more preferably 33.0 to 54.0 obtained by multiplying the compression strength and the volume average particle diameter (μm). The resin particles with a multiplication product of the volume average particle diameter (μm) and a compression strength (MPa) at the time of 10% compression deformation (i.e., volume average particle diameter (μm)*compression strength (MPa)) of less than 24.5 have an inferior mechanical strength, and, for example, may be broken by a kneading shear when a coating material, a flatting agent for a coating material, or the like containing the resin particles is prepared. The resin particles with a multiplication product of the volume average particle diameter and the compression strength at the time of 10% compression deformation of more than 60.0 may not provide a soft touch feeling or a sufficient scratch resistance to a coating film. It should be noted that, in this specification, "a compression strength at the time of 10% compression deformation" (merely referred to as "a compression strength" hereinafter) refers to a compression strength obtained by a measurement method described in the section of Examples below.

Moreover, the resin particles of the present invention include polymer obtained by polymerizing a monomer mixture containing a monofunctional (meth)acrylic ester monomer, a monomer represented by the general formula (I), and a monomer represented by the general formula (II) in a predetermined ratio. The resin particles include such polymer, so that the above-described volume average particle diameter, recovery rate, and compression strength can be secured.

There is no particular limitation on the monofunctional (meth)acrylic ester monomer contained in the monomer mixture, and examples thereof include known monofunctional (meth)acrylic ester monomers having an alkenyl group, for example, an acrylic ester such as methyl acrylate, ethyl acrylate, n-butyl acrylate, isobutyl acrylate, t-butyl acrylate, and 2-ethylhexyl acrylate; and a methacrylic ester such as methyl methacrylate, ethyl methacrylate, isobutyl methacrylate, cyclohexyl methacrylate, benzyl methacrylate, isobornyl methacrylate, 2-hydroxyethyl methacrylate, 2-methoxyethyl methacrylate, glycidyl methacrylate, tetrahydrofurfuryl methacrylate, diethylaminoethyl methacrylate, trifluoroethyl methacrylate, heptadecafluorodecyl methacrylate, n-butyl methacrylate, t-butyl methacrylate, and 2-ethylhexyl methacrylate. These monofunctional (meth)acrylic ester monomers can be used alone or in combination of two or more.

Of known monofunctional (meth)acrylic ester monomers, when acrylic ester having an alkyl group with 1 to 8 carbon atoms, and more preferably 1 to 4 carbon atoms is used as the monofunctional (meth)acrylic ester monomer, it is possible to enhance the mechanical strength of the resin particles, and therefore, for example, it is possible to sufficiently prevent the resin particles from being broken by a kneading shear when a coating material containing the resin particles is prepared.

Moreover, of known monofunctional (meth)acrylic ester monomers, when a monofunctional (meth)acrylic ester monomer that is homopolymerized to provide polymer with a glass transition temperature of 20° C. or less is used, it is possible to soften the resin particles and provide high recovery force, elasticity, and the like to the resin particles. The resin particles thus provided with the high recovery force, elasticity, and the like can be blended into a coating material to enhance the scratch resistance of a coating film obtained from the coating material and provide a soft touch feeling to the coating film. It should be noted that examples of the monofunctional (meth)acrylic ester monomers that are homopolymerized to provide polymer with a glass transition temperature of 20° C. or less include an acrylic ester such as ethyl acrylate, n-butyl acrylate, isobutyl acrylate and 2-ethylhexyl acrylate; and a methacrylic ester such as n-butyl methacrylate and 2-ethylhexyl methacrylate.

Furthermore, a monofunctional (meth)acrylic ester monomer that is homopolymerized to provide polymer with a glass transition temperature of more than 20° C. can be used with a monofunctional (meth)acrylic ester monomer that is homopolymerized to provide polymer with a glass transition temperature of 20° C. or less. Examples of the monofunctional (meth)acrylic ester monomers that are homopolymerized to provide polymer with a glass transition temperature of more than 20° C. include methyl acrylate, methyl methacrylate, ethyl methacrylate, isobutyl methacrylate, cyclohexyl methacrylate, benzyl methacrylate, isobornyl methacrylate, 2-hydroxyethyl methacrylate, 2-methoxyethyl methacrylate, glycidyl methacrylate, tetrahydrofurfuryl methacrylate, diethylaminoethyl methacrylate, trifluoroethyl methacrylate, and heptadecafluorodecyl methacrylate.

Moreover, the content amount of the monofunctional (meth)acrylic ester monomer in the monomer mixture is 65.0 to 85.0 parts by weight, and more preferably 75.0 to 80.0 parts by weight with respect to 100 parts by weight of the total amount of the monofunctional (meth)acrylic ester monomer, the monomer represented by the general formula (I) and the monomer represented by the general formula (I). If the content amount of the monofunctional (meth)acrylic ester monomer in the monomer mixture is not in the range of 65.0 to 85.0 parts by weight with respect to 100 parts by weight of the total amount of the monomers, the above-described volume average particle diameter, recovery rate, and compression strength are not provided to the resin particles, so that the effect of the resin particles for providing a scratch resistance to a coating film may not be obtained.

Examples of the monomer that is contained in the monomer mixture and represented by the general formula (I) include ethylene glycol di(meth)acrylate, diethylene glycol di(meth)acrylate, triethylene glycol di(meth)acrylate, and tetraethylene glycol di(meth)acrylate. Ethylene glycol di(meth)acrylate is particularly preferable as the monomer represented by the general formula (I). Ethylene glycol di(meth)acrylate can be used as the monomer represented by the general formula (I) to more effectively enhance the solvent resistance of the resin particles for the amount of the ethylene glycol di(meth)acrylate added.

The content amount of the monomer represented by the general formula (I) in the monomer mixture is 0.5 to 5.0 parts by weight, more preferably 0.5 to less than 2.0 parts by weight, and even more preferably 0.5 to 1.0 part by weight with respect to 100 parts by weight of the total amount of the monofunctional (meth)acrylic ester monomer, the monomer represented by the general formula (I) and the monomer represented by the general formula (II). If the content amount of the monomer represented by the general formula (I) in the monomer mixture is not in the range of 0.5 to 5.0 parts by weight with respect to 100 parts by weight of the total amount of the monomers, the above-described volume average particle diameter, recovery rate, and compression strength are not provided to the resin particles, so that the effect of the resin particles for providing a scratch resistance to a coating film may not be obtained, or a sufficient solvent resistance may not be provided to the resin particles.

Examples of the monomer that is contained in the monomer mixture and represented by the general formula (II) include pentaethylene glycol di(meth)acrylate, hexaethylene glycol di(meth)acrylate, heptaethylene glycol di(meth)acrylate, octaethylene glycol di(meth)acrylate, nonaethylene glycol di(meth)acrylate, decaethylene glycol di(meth)acrylate, tetradecaethylene glycol di(meth)acrylate, and pentadecaethylene glycol di(meth)acrylate. When a monomer in which m in the general formula (II) is between nonaethylene glycol di(meth)acrylate (m=9) and tetradecaethylene glycol di(meth)acrylate (m=14), namely, a monomer in which m in the general formula (II) is in the range of 9 to 14 is used as the monomer represented by the general formula (ID, the resin particles with the above-described volume average particle diameter, recovery rate, and compression strength can be obtained with high reproducibility.

The content amount of the monomer represented by the general formula (II) in the monomer mixture is 10.0 to 30.0 parts by weight, and more preferably 10.0 to 20.0 parts by weight with respect to 100 parts by weight of the total amount of the monofunctional (meth)acrylic ester monomer, the monomer represented by the general formula (I) and the monomer represented by the general formula (II). If the content amount of the monomer represented by the general formula (II) in the monomer mixture is not in the range of 10.0 to 30.0 parts by weight with respect to 100 parts by weight of the total amount of the monomers, the above-described volume average particle diameter, recovery rate, and compression strength are not provided to the resin particles, so that the effect of the resin particles for providing a scratch resistance to a coating film may not be obtained. Furthermore, if the content amount of the monomer represented by the general formula (II) in the monomer mixture is more than 30.0 parts by weight with respect to 100 parts by weight of the total amount of the monomers, the resin particles have high hydrophilicity, and may have poor dispersibility when being dispersed in a solvent.

It should be noted that other monomers than the above-described monomers can be contained in the monomer mixture as long as the effect of the present invention is not impaired.

For example, another monomer capable of copolymerizing with the monofunctional (meth)acrylic ester monomer can be contained in the monomer mixture. Examples of another monomer capable of copolymerizing with the monofunctional (meth)acrylic ester monomer include styrene, p-methyl styrene, α-methyl styrene, and a compound having a vinyl group such as vinyl acetate. Another monomer capable of copolymerizing with the monofunctional (meth)acrylic ester monomer can be used alone or in combination of two or more.

Moreover, another crosslinkable monomer having two or more alkenyl groups (referred to as another crosslinkable monomer hereinafter) than monomers represented by the general formula (I) and the general formula (II) can be contained in the monomer mixture as long as the effect of the present invention is not impaired. Examples of another crosslinkable monomer include a polyfunctional (meth) acrylic ester-based monomer having two or more alkenyl groups such as 1,3-butylene glycol di(meth)acrylate, 1,4-butanediol di(meth)acrylate, 1,6-hexanediol di(meth)acrylate, glycerin di(meth)acrylate, trimethylolpropane tri(meth)acrylate, pentaerythritol tetra(meth)acrylate, phthalic acid diethylene glycol di(meth)acrylate, caprolactone-modified dipentaerythritol hexa(meth)acrylate, caprolactone-modified hydroxy pivalic acid ester neopentyl glycol diacrylate, polyester acrylate, and urethane acrylate; and an aromatic divinyl-based monomer such as divinyl benzene, divinyl naphthalene, and derivatives thereof.

As described above, since the resin particles of the present invention include polymer of the monomer mixture containing the monofunctional (meth)acrylic ester monomer, the monomer represented by the general formula (I), and the monomer represented by the general formula (II) in a predetermined ratio, have a volume average particle diameter of 5 to 50 μm, a recovery rate of 15% or more and less than 30%, and a compression strength (MPa) that provides a multiplication product in the range of 24.5 to 60.0 obtained by multiplying the compression strength and the volume average particle diameter (μm), the resin particles can be blended into a coating material to provide a soft touch feeling to a coating film obtained from the coating material and to enhance a scratch resistance of the coating film. Moreover, since the resin particles of the present invention have a volume average particle diameter of 5 to 50 μm, the resin particles can be blended into a coating material to provide matte properties to the coating film obtained from the coating material. Furthermore, since the resin particles of the present invention contain a component derived from the monomer represented by the above general formula (I) having a solvent resistance, the resin particles have an excellent solvent resistance.

It should be noted that the resin particles of the present invention can be resin particles in which inorganic powder is attached to the surface of the polymer of the monomer mixture in order to prevent mutual sticking of the resin particles.

Examples of such inorganic powder include silica, alumina, titania, zirconia, ceria, iron oxide, and zinc oxide.

A primary particle diameter of the inorganic powder is preferably 1 to 20 nm, and more preferably 5 to 15 nm. If the primary particle diameter of the inorganic powder is not in the range of 1 to 20 nm, the surface of the polymer cannot be sufficiently protected with the inorganic powder, and therefore, the mutual sticking of the resin particles may not be sufficiently prevented.

Moreover, the amount of the inorganic powder attached to the polymer of the monomer mixture is preferably 0.1 to 10 parts by weight, and more preferably 1.0 to 6.0 parts by weight with respect to 100 parts by weight of the total amount of the polymer of the monomer mixture and the inorganic powder. If the amount of the attached inorganic powder is less than 0.1 parts by weight with respect to 100 parts by weight of the total amount of the polymer of the monomer mixture and the inorganic powder, the mutual sticking of the resin particles may not be sufficiently prevented. If the amount of the attached inorganic powder is more than 10 parts by weight with respect to 100 parts by weight of the total amount of the polymer of the monomer mixture and the inorganic powder, a touch feeling of the coating film may be degraded by a touch feeling of the inorganic powder, and the transparency of the coating film may be degraded by the inorganic powder to cause the coating film to become white.

The resin particles of the present invention can be the polymer of the monomer mixture itself. That is, the resin particles of the present invention can be particles to whose surfaces no inorganic powder is attached. Even such resin particles to whose surfaces no inorganic powder is attached can be used by mixing with the inorganic powder to obtain the effect of suppressing the mutual sticking of the resin particles. The above-described amount of the attached inorganic powder can be applied to the amount of the inorganic powder used in the case of using such resin particles by mixing with the inorganic powder.

Method for Producing the Resin Particles of the Present Invention

The resin particles of the present invention can be obtained by polymerizing the monomer mixture containing the monofunctional (meth)acrylic ester monomer, the monomer represented by the general formula (I), and the monomer represented by the general formula (II) in the predetermined ratio.

A known method for obtaining the resin particles such as emulsion polymerization, dispersion polymerization, suspension polymerization, and seed polymerization is used as a polymerization method. Suspension polymerization in an aqueous medium, which can be performed at a lower cost, is preferable.

Examples of the aqueous medium include water and a mixture of water and aqueous organic solvent (e.g., lower alcohol).

The suspension polymerization can be performed in the presence of a polymerization initiator as necessary.

Examples of the polymerization initiator include oil soluble peroxide such as benzoyl peroxide, lauroyl peroxide, octanoyl peroxide, ortho chlorobenzoyl peroxide, methyl ethyl ketone peroxide, diisopropyl peroxydicarbonate, cumene hydroperoxide, and t-butyl hydroperoxide; and oil-soluble azo compound such as 2,2'-azobisisobutyronitrile and 2,2'-azobis(2,4-dimethylvaleronitrile). These polymerization initiators can be used alone or in combination of two or more. It should be noted that a sufficient amount of the polymerization initiator used is approximately 0.1 to 1 part by weight with respect to 100 parts by weight of the total amount of the monofunctional (meth)acrylic ester monomer, the monomer represented by the general formula (I), and the monomer represented by the general formula (II).

The suspension polymerization can be performed in the presence of a dispersant and/or a surfactant as necessary.

Examples of the dispersant include a hardly water soluble inorganic salt such as calcium phosphate and magnesium pyrophosphate; and water soluble polymer such as polyvinyl alcohol, methyl cellulose, and polyvinyl pyrrolidone.

Moreover, examples of the surfactant include an anionic surfactant such as sodium oleate, sodium lauryl sulfate, sodium dodecylbenzenesulfonate, alkylnaphthalene sulfonate, and alkyl phosphate ester salt; a nonionic surfactant such as polyoxyethylene alkyl ether, polyoxyethylene alkyl phenyl ether, polyoxyethylene fatty acid ester, sorbitan fatty acid ester, polyoxysorbitan fatty acid ester, polyoxyethylene alkylamine, and glycerine fatty acid ester; and an amphoteric surfactant such as lauryldimethylamine oxide.

The dispersant and surfactant can be used alone or in combination of two or more. Particularly, in view of dispersion stability, it is preferable to use a combination of a dispersant that is a hardly water soluble phosphate salt such as calcium phosphate and magnesium pyrophosphate, and an anionic surfactant such as alkyl sulfate salt and alkylbenzene sulfonate salt.

It should be noted that the amount of the dispersant used is approximately 0.5 to 10 parts by weight with respect to 100 parts by weight of the total amount of the monofunctional (meth)acrylic ester monomer, the monomer represented by the general formula (I), and the monomer represented by the general formula (II), and the amount of the surfactant used is approximately 0.01 to 0.2 parts by weight with respect to 100 parts by weight of the aqueous medium.

When the suspension polymerization is performed in the presence of the inorganic powder, it is possible to produce resin particles in which the inorganic powder is attached to the surface of the polymer. In this case, the amount of the used inorganic powder corresponds to the above-described amount of the attached inorganic powder, and is approximately 0.1 to 10 parts by weight with respect to 100 parts by weight of the total amount of the monomer mixture and the inorganic powder.

An oil phase containing the monomer mixture is prepared, and then, while the prepared oil phase is dispersed in an aqueous phase containing an aqueous medium, the suspension polymerization can be started by heating the aqueous phase in which the oil phase is dispersed. It should be noted that if the polymerization initiator is used, the oil phase is prepared by mixing the polymerization initiator in the monomer mixture. Moreover, if the dispersant and/or surfactant are used, the aqueous phase is prepared by mixing the dispersant and/or surfactant in the aqueous medium. Furthermore, if the inorganic powder is used, the aqueous phase in which the inorganic powder is mixed in the aqueous medium is prepared. It should be noted that the volume average particle diameter of the resin particles can be appropriately controlled by adjusting the mixing ratio of the oil phase and aqueous phase, the amount of the dispersant and surfactant used, a stirring condition, and a dispersion condition.

Examples of a method for dispersing the oil phase in the aqueous phase include various methods such as a method in which the oil phase is directly added to the aqueous phase and dispersed as droplets in the aqueous phase by the stirring strength of a propeller blade or the like; a method in which the oil phase is directly added to the aqueous phase and dispersed in the aqueous phase using a homomixer that is a disperser including a rotor and stator and utilizing a high shearing strength; and a method in which the oil phase is directly added to the aqueous phase and dispersed in the aqueous phase using an ultrasonic disperser or the like. Particularly, a method in which the oil phase is directly added to the aqueous phase and dispersed as droplets in the aqueous phase by a mutual collision of the droplets of the mixture or a collision of the mixture to a machine wall using a high pressure type disperser such as Microfluidizer and Nanomizer (registered trademark); and a method in which an oil phase is injected to the aqueous phase through a porous membrane of a micro porous glass (MPG) are preferable because the particle diameter can be made uniform by the methods.

The polymerization temperature is preferably approximately 40 to 90° C. The polymerization temperature is kept at these temperatures preferably for approximately 0.1 to 10 hours. It should be noted that polymerization reaction can be performed under an atmosphere of an inert gas that is inert to the reactants in the polymerization reaction system (oil phase), for example, under a nitrogen atmosphere. If the boiling point of the monomer mixture is around the polymerization temperature or at the polymerization temperature or lower, it is preferable that the suspension polymerization is performed under a sealed condition or under pressure using pressureproof polymerization equipment such as an autoclave so as not to volatilize the monomer mixture.

After the polymerization reaction is finished, it is possible to obtain the target resin particles by decomposing and removing the dispersant using an acid or the like if desired, and by performing a filtration, washing with water, desiccation, drying, triturating, classification, and the like.

Use of Resin Particles

Since the above-described resin particles of the present invention is soft resin particles with a volume average particle diameter of 5 to 50 μm, a recovery rate of 15% or more and less than 30%, and a compression strength (MPa) that provides a multiplication product in the range of 24.5 to 60.0 obtained by multiplying the compression strength and the volume average particle diameter (μm), the resin particles are suitably used for an additive for a coating material (e.g., a flatting agent and a softener for a coating film), a light diffusion agent for an optical film, a raw material of an external preparation such as cosmetics, and the like.

Coating Material Composition

It is possible to cause the resin particles of the present invention to be contained in a coating material (coating material composition) as a softener for a coating film or a flatting agent.

Accordingly, the coating material composition of the present invention contains the resin particles of the present invention. The coating material composition of the present invention contains at least one of a binder resin and a solvent as necessary. A resin that is soluble in an organic solvent or water, or an emulsion-type aqueous resin that can be dispersed in water can be used as the binder resin. Examples of such binder resins include an acrylic resin, alkyd resin, polyester resin, polyurethane resin, chlorinated polyolefin resin, and amorphous polyolefin resin. A binder resin can be selected from these resins as appropriate depending on the adhesiveness of the coating material to a substrate to be coated, the use environment, or the like.

The amounts of the binder resin and the resin particles added vary depending on the thickness of the coating film to be formed, the volume average particle diameter of the resin particles, and a coating method. The amount of the binder resin added is preferably 50 to 95 parts by weight, more preferably 60 to 95 parts by weight, and even more preferably 60 to 90 parts by weight with respect to 100 parts by weight of the total amount of the binder resin (solid content when the emulsion-type aqueous resin is used) and the resin particles.

The amount of the resin particles added is preferably 5 to 50 parts by weight, more preferably 5 to 40 parts by weight, and even more preferably 10 to 40 parts by weight with respect to the total amount of the binder resin (solid content when the emulsion-type aqueous resin is used) and the resin particles. When the content amount of the resin particles is less than 5 parts by weight, a sufficient matting effect may not be obtained. Moreover, when the content amount of the resin particles is more than 50 parts by weight, the resin particles may be poorly dispersed in the coating material because the viscosity of the coating material becomes too high. Therefore, defect of the appearance such as microcracks and surface roughness of the coating film to be obtained may occur in the coating film.

There is no particular limitation on a solvent contained in the coating material composition, but it is preferable to use a solvent in which the binder resin can be dissolved or dispersed. When the coating material composition is an oil coating material, examples of the solvent include a hydrocarbon-based solvent such as toluene and xylene; a ketone-based solvent such as methyl ethyl ketone and methyl isobutyl ketone; an ester-based solvent such as ethyl acetate and butyl acetate; and an ether-based solvent such as dioxane, ethylene glycol diethyl ether, and ethylene glycol monobutyl ether. When the coating material composition is a water-based coating material, water, alcohol, and the like can be used as the solvent. These solvents can be used alone or in combination of two or more. The content amount of the solvent in the coating material composition is generally in the range of 20 to 60 parts by weight with respect to 100 parts by weight of the total amount of the coating material composition.

The coating material composition can contain a known coating surface adjusting agent, fluidity adjusting agent, ultraviolet absorbing agent, light stabilizer, curing catalyst, extender pigment, color pigment, metal pigment, mica powder pigment, dye, and the like as necessary.

There is no particular limitation on a method for forming a coating film using the coating material composition, and any of known methods can be used. Examples of a method for forming a coating film include a spray coating method, roll coating method, and brush coating method. The coating material composition can be diluted by adding a diluent thereto in order to adjust the viscosity as necessary. Examples of the diluent include a hydrocarbon-based solvent such as toluene and xylene; ketone-based solvent such as methyl ethyl ketone and methyl isobutyl ketone; ester-based solvent such as ethyl acetate and butyl acetate; ether-based solvent such as dioxane and ethylene glycol diethyl ether; water; and alcohol-based solvent. These diluents can be used alone or in combination of two or more.

Optical Film

The resin particles of the present invention can be used as a light diffusion agent for an optical film. The optical film of the present invention includes a substrate film and a coating film including the coating material composition containing the resin particles of the present invention, the coating film being formed on at least one surface of the substrate film. Such an optical film of the present invention can be used as an antiglare film, light diffusion film, and the like.

There is no particular limitation on a material of the substrate film as long as it has transparency, and examples thereof include a polyester-based resin such as polyethylene telephthalate, triacetyl cellulose resin, polystyrene-based resin, polycarbonate-based resin, and cycloolefine-based resin.

It is preferable that the thickness of the substrate film is in the range of 5 to 300 µm. When the thickness of the substrate film is smaller than 5 µm, it is difficult to handle the substrate film in a coating, printing, and secondary operation, and therefore, the workability may be reduced. On the other hand, when the thickness of the substrate film is greater than 300 µm, visible light transmittance of the substrate film itself may be reduced.

The optical film of the present invention can be obtained by forming a coating film including the coating material composition of the present invention on at least one surface of a substrate film by the above-described method for forming the coating film.

External Preparation

Furthermore, the resin particles of the present invention can be also used as a raw material of an external preparation. The external preparation of the present invention contains the resin particles of the present invention. The content amount of the resin particles in the external preparation can be set as appropriate depending on the type of the external preparation, and is preferably in the range of 1 to 80% by weight, and more preferably 5 to 70% by weight. When the content amount of the resin particles is less than 1% by weight with respect to the total amount of the external preparation, clear effects obtained by containing the resin particles may not be presented. Moreover, when the content amount of the resin particles is more than 80% by weight, remarkable effects proportional to the increase of the content amount may not be presented, and therefore, it is not preferable in terms of production cost.

Examples of the external preparation include cosmetics and a medicine for external use.

There is no particular limitation on cosmetics as long as it produces an effect by containing the resin particles, and examples thereof include liquid cosmetics such as a preshave lotion, body lotion, face lotion, cream, milky lotion, body shampoo, and antiperspirant; cleaning cosmetics such as a soap and scrub cleanser; pack; shaving cream; face powder; foundation; lipstick; lip balm; cheek color; eye-eyebrow cosmetics; nail polish cosmetics; hair washing cosmetics; hair coloring preparation; hair dressing; aromatic cosmetics; toothpaste; bath preparations; sunscreen product; suntan product; and cosmetics for bodies such as body powder and baby powder.

There is no particular limitation on the medicine for external use as long as it is applied to the skin, and examples thereof include a medicinal cream, ointment, medicinal emulsion, and medicinal lotion.

A principal ingredient and additive used generally can be blended into these medicines for external use depending on the purposes as long as the effect of the present invention is not impaired. Examples of such a principal ingredient and additive include water, lower alcohol (alcohol with 5 or less carbon atoms), fat and wax, hydrocarbon, higher fatty acid (fatty acid with 12 or more carbon atoms), higher alcohol (alcohol with 6 or more carbon atoms), sterol, fatty acid ester (e.g., cetyl 2-ethylhexanoate), metal soap, moisturizing agent, surfactant (e.g., sorbitan sesquioleate), macromolecular compounds, clay mineral (component having various functions such as an extender pigment and adsorbent; e.g., talc and mica), coloring material (e.g., titanium oxide, red iron oxide, yellow iron oxide, and black iron oxide), fragrance, antiseptic/germicide, antioxidant, ultraviolet absorbing agent, other resin particles such as silicone-based particles and polystyrene particles, and specially blended additive.

EXAMPLES

Hereinafter, the present invention will be described by way of examples and comparative examples, but the present invention is not limited thereto. First, measurement methods and calculation methods in examples and comparative examples will be described.

Method for Measuring Volume Average Particle Diameter

The volume average particle diameter of the resin particles was calculated by filling an aperture having an aperture diameter of 50 to 280 μm with electrolyte solution and determining the volume based on the change in conductivity of the electrolyte solution at the time when the particles passed through the electrolyte solution. Specifically, the volume average particle diameter of the resin particles is a volume average particle diameter (arithmetic average diameter in particle size distribution based on volume) measured by a Coulter method using a Coulter method precise particle size distribution measuring apparatus Multisizer II (manufactured by Beckman Coulter, Inc.). It should be noted that in the measurement, according to REFERENCE MANUAL FOR THE COULTER MULTISIZER (1987) published by Coulter Electronics Limited, the Multisizer II was calibrated using the following aperture tubes suitable for the particle diameter of the particles to be measured, and then the measurement was performed. That is, the measurement was performed using aperture tubes having an aperture diameter of 50 μm for the resin particles with a volume average particle diameter of less than 10 μm, aperture tubes having an aperture diameter of 100 μm for the resin particles with a volume average particle diameter of 10 to 30 μm, and aperture tubes having an aperture diameter of 280 μm for the resin particles with a volume average particle diameter of more than 30 μm.

Specifically, 0.1 g of the resin particles and 10 ml of 0.1% nonionic surfactant aqueous solution were put into a commercially available glass test tube and mixed for 2 seconds with "TOUCHMIXER MT-31", which is a touch mixer manufactured by Yamato Scientific Co., Ltd., and then a dispersion was obtained by predispersing the resin particles for 10 seconds in the test tube using "ULTRASONIC CLEANER VS-150" manufactured by Velvo-Clear, which is a commercially available ultrasonic cleaner. The dispersion was dropped with a dropper into a beaker filled with "ISOTON (registered trademark) II" (manufactured by Beckman Coulter, Inc.), which is an electrolyte solution for measurement equipped to the Multisizer II body, with being gently stirred, and then an indication of a concentration meter of the Multisizer II body screen was set to approximately 10%. Aperture size (diameter), Current (aperture current), Gain (gain), and Polarity (polarity of an inner electrode) were inputted into the Multisizer II body according to REFERENCE MANUAL FOR THE COULTER MULTISIZER (1987) published by Coulter Electronics Limited, and the manual measurement (manual mode) was performed. The dispersion in the beaker was gently stirred in such a degree that air bubbles were not generated during the measurement, and the measurement was finished when one hundred thousand of the resin particles were measured.

Method for Measuring Compression Strength

A compression strength of the resin particle was measured under the following measurement condition using "MCTM200", which is a micro compression tester manufactured by Shimadzu Corporation. Specifically, a deformation amount of the resin particle and a load were measured when the load was applied to one resin particle at the following loading rate. The compression strength was calculated by substituting the load (N) at the time when the resin particle was deformed and the particle diameter was reduced by 10%, and the particle diameter of the resin particle before being deformed in the following formula.

<Formula for Calculating Compression Strength>

$$\text{Compression strength (MPa)} = 2.8 * \text{load}(N) / \{\pi * (\text{particle diameter (mm)})^2\}$$

<Condition for Measuring Compression Strength>
Test temperature: Normal temperature (25° C.)
Upper pressure indenter: Flat indenter with a diameter of 50 μm (Material: Diamond)
Lower pressure plate: SKS flat plate
Measurement mode: Compression test (MODE 1)
Test load: 9.8 mN
Loading rate: 0.71 mN/second
Full scale displacement: 10 μm Method for Measuring Recovery Rate A recovery rate of the resin particle was measured under the following measurement condition using "MCTM200", which is a micro compression tester manufactured by Shimadzu Corporation. Specifically, a recovered amount of displacement (displacement of the particle diameter) at the time when the load of 9.8 mN was applied to one resin particle at the following loading rate and then the load was reduced to 1.96 mN was measured. The recovery rate was calculated by substituting the measured recovery amount and the particle diameter of the resin particle before being loaded in the following formula.

<Formula for Calculating Recovery Rate>

$$\text{Recovery rate}(\%) = [\text{Recovery amount } (\mu m) / \text{Particle diameter (mm)}] * 100$$

<Condition for Measuring Recovery Rate>
Test temperature: Normal temperature (25° C.)
Upper pressure indenter: Flat indenter with a diameter of 50 μm (Material: Diamond)
Lower pressure plate: SKS flat plate
Measurement mode: Unloading test (MODE 2)
Inverse load: 9.8 mN
Load for original point: 9.8 mN
Loading rate: 0.98 mN/second
Full scale displacement: 10 μm Method for Measuring Amount of Toluene Absorbed An amount of toluene absorbed in 1 g of the resin particles at the time when the resin particles were immersed in toluene for 24 hours was measured by the following method.

That is, 1 g of the resin particles and 6 g of toluene were put into a centrifuge tube, the resin particles were dispersed in toluene, and then the dispersion was allowed to stand for 24 hours. Next, the centrifuge tube was set in a centrifugal machine and centrifuged at 2,500 rpm for 10 minutes to precipitate the resin particles. The supernatant was removed from the centrifuge tube, and the weight of the residual precipitation was measured. An amount obtained by subtracting 1 g of the resin particles that was put into the centrifuge tube from the measured weight of the precipitation was an amount of toluene absorbed (g/g) per 1 g of the resin particles.

Example 1

Production of Resin Particles

Preparation of Aqueous Phase

An aqueous phase was prepared by putting 200 parts by weight of deionized water as an aqueous medium, 10 parts by weight of magnesium pyrophosphate as the dispersant, and 0.04 parts by weight of sodium lauryl sulfate as the anionic surfactant into a beaker.

Preparation of Oil Phase

A mixture as an oil phase was prepared by putting 79 parts by weight of butyl acrylate as the monofunctional (meth) acrylic ester monomer, 1 part by weight of ethylene glycol dimethacrylate ("Light Ester EG" manufactured by Kyoeisha Chemical Co., LTD.) as the monomer represented by the general formula (I), 20 parts by weight of tetradecaethylene glycol dimethacrylate ("Light Ester 14EG" manufactured by Kyoeisha Chemical Co., LTD.) as the monomer represented by the general formula (II), 0.2 parts by weight of 2,2'-azobis (2,4-dimethylvaleronitrile) as the polymerization initiator, and 0.3 parts by weight of benzoyl peroxide as the polymerization initiator into a different beaker from the beaker used for the preparation of the aqueous phase, and by stirring them sufficiently.

Polymerization Reaction

The prepared oil phase was added to the previously prepared aqueous phase and was dispersed in the aqueous phase by stirring at a stirring rate of 5,000 rpm for 10 minutes with a homomixer (table top type "TK Homogenizing Mixer" manufactured by PRIMIX Corporation), so that a dispersion was obtained. Suspension polymerization reaction was performed by putting this dispersion into a polymerization reactor provided with a stirrer, heater, and thermometer and stirring the dispersion at 60° C. for 6 hours. After the suspension (reaction liquid) in the polymerization reactor was cooled to 30° C., hydrochloric acid was added thereto to decompose magnesium pyrophosphate. The suspension was filtered under reduced pressure. After the filtration residue was washed with ion exchanged water and desiccated, 3 parts by weight of silica ("R974" with the primary particle diameter of 12 nm; manufactured by Nippon Aerosil Co., Ltd.) were added thereto as the inorganic powder and the mixture was dried in a vacuum drier at 60° C. and triturated, so that the target resin particles were obtained.

The obtained resin particles had a volume average particle diameter of 7.7 μm when being measured by the measurement method. The obtained resin particles had a compression strength of 4.4 MPa when being measured by the measurement method. Additionally, the obtained resin particles had a recovery rate of 19.8% when being measured by the measurement method. Furthermore, the amount of toluene absorbed in 1 g of the resin particles at the time when the resin particles were immersed in toluene for 24 hours was measured for the obtained resin particles by the measurement method, and the amount of toluene absorbed was 2.6 g/g.

Example 2

Production of Resin Particles

The target resin particles were obtained in the same manner as in Example 1, except that in Preparation of Oil Phase, nonaethylene glycol dimethacrylate ("Light Ester 9EG" manufactured by Kyoeisha Chemical Co., LTD.) was used as the monomer represented by the general formula (II) in place of tetradecaethylene glycol dimethacrylate.

The obtained resin particles had a volume average particle diameter of 7.8 μm when being measured by the measurement method. The obtained resin particles had a compression strength of 5.0 MPa when being measured by the measurement method. Additionally, the obtained resin particles had a recovery rate of 18.8% when being measured by the measurement method. Furthermore, the amount of toluene absorbed in 1 g of the resin particles at the time when the resin particles were immersed in toluene for 24 hours was measured for the obtained resin particles by the measurement method, and the amount of toluene absorbed was 2.4 g/g.

Example 3

Production of Resin Particles

The target resin particles were obtained in the same manner as in Example 1, except that in Preparation of Oil Phase, the amount of ethylene glycol dimethacrylate blended was 5 parts by weight and the amount of butyl acrylate blended was 75 parts by weight.

The obtained resin particles had a volume average particle diameter of 8.1 μm when being measured by the measurement method. The obtained resin particles had a compression strength of 5.5 MPa when being measured by the measurement method. Additionally, the obtained resin particles had a recovery rate of 25.0% when being measured by the measurement method. Furthermore, the amount of toluene absorbed in 1 g of the resin particles at the time when the resin particles were immersed in toluene for 24 hours was measured for the obtained resin particles by the measurement method, and the amount of toluene absorbed was 2.1 g/g.

Example 4

Production of Resin Particles

The target resin particles were obtained in the same manner as in Example 1, except that in Preparation of Oil Phase, butyl methacrylate was used as the monofunctional (meth)acrylic ester monomer in place of butyl acrylate. The obtained resin particles had a volume average particle diameter of 8.0 μm when being measured by the measurement method. The obtained resin particles had a compression strength of 6.1 MPa when being measured by the measurement method. Additionally, the obtained resin particles had a recovery rate of 16.4% when being measured by the measurement method. Furthermore, the amount of toluene absorbed in 1 g of the resin particles at the time when the resin particles were immersed in toluene for 24 hours was measured for the obtained resin particles by the measurement method, and the amount of toluene absorbed was 4.5 g/g.

Example 5

Production of Resin Particles

The target resin particles were obtained in the same manner as in Example 1, except that in Preparation of Oil Phase, butyl methacrylate was used as the monofunctional (meth)acrylic ester monomer in place of butyl acrylate and nonaethylene glycol dimethacrylate ("Light Ester 9EG" manufactured by Kyoeisha Chemical Co., LTD.) was used as the monomer represented by the above general formula (II) in place of tetradecaethylene glycol dimethacrylate.

The obtained resin particles had a volume average particle diameter of 7.6 μm when being measured by the measurement method. The obtained resin particles had a compression strength of 6.5 MPa when being measured by the measurement method. Additionally, the obtained resin particles had a recovery rate of 15.7% when being measured by the measurement method. Furthermore, the amount of toluene absorbed in 1 g of the resin particles at the time when the resin particles were immersed in toluene for 24 hours was measured for the obtained resin particles by the measurement method, and the amount of toluene absorbed was 4.1 g/g.

Example 6

Production of Resin Particles

The target resin particles were obtained in the same manner as in Example 1, except that in Preparation of Oil Phase, butyl methacrylate was used as the monofunctional (meth)acrylic ester monomer in place of butyl acrylate, the amount of the butyl methacrylate blended was 75 parts by weight, and the amount of ethylene glycol dimethacrylate blended was 5 parts by weight. The obtained resin particles had a volume average particle diameter of 7.8 μm when being measured by the measurement method.

The obtained resin particles had a compression strength of 7.0 MPa when being measured by the measurement method. Additionally, the obtained resin particles had a recovery rate of 26.7% when being measured by the measurement method. Furthermore, the amount of toluene absorbed in 1 g of the resin particles at the time when the resin particles were immersed in toluene for 24 hours was measured for the obtained resin particles by the measurement method, and the amount of toluene absorbed was 1.8 g/g.

Comparative Example 1

Production of Resin Particles for Comparison

Preparation of Aqueous Phase

An aqueous phase was prepared by putting 400 parts by weight of deionized water as an aqueous medium, 10 parts by weight of magnesium pyrophosphate as the dispersant, and 0.04 parts by weight of sodium lauryl sulfate as the anionic surfactant into a beaker.

Preparation of Oil Phase

A mixture as an oil phase was prepared by putting 80 parts by weight of butyl acrylate as the monofunctional (meth)acrylic ester monomer, 20 parts by weight of tetradecaethylene glycol dimethacrylate ("Light Ester 14EG" manufactured by Kyoeisha Chemical Co., LTD.) as the monomer represented by the above general formula (II), and 0.3 parts by weight of benzoyl peroxide as the polymerization initiator into a different beaker from the beaker used for the preparation of the aqueous phase, and by stirring them sufficiently.

Polymerization Reaction

The prepared oil phase was added to the previously prepared aqueous phase and the oil phase was dispersed in the aqueous phase by stirring at a stirring rate of 5,000 rpm for 10 minutes with a homomixer (table top type "TK Homogenizing Mixer" manufactured by PRIMIX Corporation), so that a dispersion was obtained. Suspension polymerization reaction was performed by putting this dispersion into a polymerization reactor provided with a stirrer, heater, and thermometer and stirring the dispersion at 60° C. for 6 hours. After the suspension (reaction liquid) in the polymerization reactor was cooled to 30° C., hydrochloric acid was added thereto to decompose magnesium pyrophosphate. The suspension was filtered under reduced pressure. After the filtration residue was washed with ion exchanged water and desiccated, 3 parts by weight of silica ("R974" with the primary particle diameter of 12 nm; manufactured by Nippon Aerosil Co., Ltd.) were added thereto as the inorganic powder and the mixture was dried in a vacuum drier at 60° C. and triturated, so that the target resin particles were obtained.

The obtained resin particles had a volume average particle diameter of 7.7 μm when being measured by the measurement method. The obtained resin particles had a compression strength of 3.4 MPa when being measured by the measurement method. Additionally, the obtained resin particles had a recovery rate of 31.0% when being measured by the measurement method. Furthermore, the amount of toluene absorbed in 1 g of the resin particles at the time when the resin particles were immersed in toluene for 24 hours was measured for the obtained resin particles by the measurement method, and the amount of toluene absorbed was 3.2 g/g.

Comparative Example 2

Production of Resin Particles for Comparison

The target resin particles were obtained in the same manner as in Comparative Example 1, except that the amount of tetradecaethylene glycol dimethacrylate blended was 35 parts by weight in the oil phase and the amount of butyl acrylate blended was 65 parts by weight in the oil phase.

The obtained resin particles had a volume average particle diameter of 7.6 μm when being measured by the measurement method. The obtained resin particles had a compression strength of 4.4 MPa when being measured by the measurement method. Additionally, the obtained resin particles had a recovery rate of 31.4% when being measured by the measurement method. Furthermore, the amount of toluene absorbed in 1 g of the resin particles at the time when the resin particles were immersed in toluene for 24 hours was measured for the obtained resin particles by the measurement method, and the amount of toluene absorbed was 2.7 g/g.

Comparative Example 3

Production of Resin Particles for Comparison

The target resin particles were obtained in the same manner as in Comparative Example 1, except that nonaethylene glycol dimethacrylate ("Light Ester 9EG" manufactured by Kyoeisha Chemical Co., LTD.) was used as the monomer represented by the above general formula (II) in place of tetradecaethylene glycol dimethacrylate, the amount of the nonaethylene glycol dimethacrylate blended was 35 parts by weight in the oil phase, and the amount of butyl acrylate blended was 65 parts by weight in the oil phase.

The obtained resin particles had a volume average particle diameter of 7.7 μm when being measured by the measurement method. The obtained resin particles had a compression strength of 4.9 MPa when being measured by the measurement method. Additionally, the obtained resin particles had a recovery rate of 13.7% when being measured by the measurement method. Furthermore, the amount of toluene absorbed in 1 g of the resin particles at the time when the resin particles were immersed in toluene for 24 hours was measured for the obtained resin particles by the measurement method, and the amount of toluene absorbed was 2.3 g/g.

Comparative Example 4

Production of Resin Particles for Comparison

The target resin particles were obtained in the same manner as in Comparative Example 1, except that in Preparation of Oil Phase, the amount of butyl acrylate blended was 64 parts by weight, the amount of tetradecaethylene glycol dimethacrylate blended was 35 parts by weight, and 1 part by weight of ethylene glycol dimethacrylate ("Light Ester EG" manufactured by Kyoeisha Chemical Co., LTD.) as the monomer represented by the above general formula (I) was further mixed.

The obtained resin particles had a volume average particle diameter of 7.9 μm when being measured by a measurement method. The obtained resin particles had the compression strength of 3.3 MPa when being measured by the measurement method. Additionally, the obtained resin particles had a recovery rate of 34.5% when being measured by the measurement method. Furthermore, the amount of toluene absorbed in 1 g of the resin particles at the time when the resin particles were immersed in toluene for 24 hours was measured for the obtained resin particles by the measurement method, and the amount of toluene absorbed was 2.8 g/g.

Comparative Example 5

Production of Resin Particles for Comparison

The target resin particles were obtained in the same manner as in Comparative Example 1, except that in Preparation of Oil Phase, butyl methacrylate was used as the monofunctional (meth)acrylic ester monomer in place of butyl acrylate, the amount of the butyl methacrylate blended was 64 parts by weight, the amount of tetradecaethylene glycol dimethacrylate blended was 35 parts by weight, and 1 part by weight of ethylene glycol dimethacrylate ("Light Ester EG" manufactured by Kyoeisha Chemical Co., LTD.) as the monomer represented by the above general formula (I) was further mixed. The obtained resin particles had a volume average particle diameter of 8.0 μm when being measured by the measurement method.

The obtained resin particles had a compression strength of 15.7 MPa when being measured by the measurement method. Additionally, the obtained resin particles had a recovery rate of 2.0% when being measured by the measurement method. Furthermore, the amount of toluene absorbed in 1 g of the resin particles at the time when the resin particles were immersed in toluene for 24 hours was measured for the obtained resin particles by the measurement method, and the amount of toluene absorbed was 4.2 g/g.

Comparative Example 6

Production of Resin Particles for Comparison

The target resin particles were obtained in the same manner as in Comparative Example 1, except that ethylene glycol dimethacrylate ("Light Ester EG" manufactured by Kyoeisha Chemical Co., LTD.) as the monomer represented by the above general formula (I) was used in place of tetradecaethylene glycol dimethacrylate.

The obtained resin particles had a volume average particle diameter of 7.6 μm when being measured by the measurement method. The obtained resin particles had a compression strength of 10.8 MPa when being measured by the measurement method. Additionally, the obtained resin particles had a recovery rate of 3.0% when being measured by the measurement method. Furthermore, the amount of toluene absorbed in 1 g of the resin particles at the time when the resin particles were immersed in toluene for 24 hours was measured for the obtained resin particles by the measurement method, and the amount of toluene absorbed was 1.7 g/g.

The following Table 1 shows the amount of each monomer used (amount of each monomer used with respect to 100 parts by weight of the total amount of the monofunctional (meth) acrylic ester monomer, the monomer represented by the general formula (I), and the monomer represented by the general formula (II)) for the production of the resin particles according to Examples 1 to 6 and Comparative Examples 1 to 6, and the values of the compression strength (MPa), volume average particle diameter (μm), multiplication product of the compression strength (MPa) and volume average particle diameter (μm) (compression strength*volume average particle diameter), recovery rate (%), and amount of toluene absorbed (g/g) of the resin particles according to Examples 1 to 6 and Comparative Examples 1 to 6.

TABLE 1

| | Amount of monomer blended (part by weight) | | | | | Compression strength (MPa) | Volume average particle diameter (μm) | Compression strength * Volume average particle diameter | Recovery rate (%) | Amount of toluene absorbed (g/g) |
|---|---|---|---|---|---|---|---|---|---|---|
| | BA | BMA | 1EG | 14EG | 9EG | | | | | |
| Ex. 1 | 79 | 0 | 1 | 20 | 0 | 4.4 | 7.7 | 33.9 | 19.8 | 2.6 |
| Ex. 2 | 79 | 0 | 1 | 0 | 20 | 5.0 | 7.8 | 39.0 | 18.8 | 2.4 |
| Ex. 3 | 75 | 0 | 5 | 20 | 0 | 5.5 | 8.1 | 44.6 | 25.0 | 2.1 |
| Ex. 4 | 0 | 79 | 1 | 20 | 0 | 6.1 | 8.0 | 48.8 | 16.4 | 4.5 |
| Ex. 5 | 0 | 79 | 1 | 0 | 20 | 6.5 | 7.6 | 49.4 | 15.7 | 4.1 |
| Ex. 6 | 0 | 75 | 5 | 20 | 0 | 7.0 | 7.8 | 54.6 | 26.7 | 1.8 |
| Com. Ex. 1 | 80 | 0 | 0 | 20 | 0 | 3.4 | 7.7 | 26.2 | 31.0 | 3.2 |
| Com. Ex. 2 | 65 | 0 | 0 | 35 | 0 | 4.4 | 7.6 | 33.4 | 31.4 | 2.7 |
| Com. Ex. 3 | 65 | 0 | 0 | 0 | 35 | 4.9 | 7.7 | 37.7 | 13.7 | 2.3 |
| Com. Ex. 4 | 64 | 0 | 1 | 35 | 0 | 3.3 | 7.9 | 26.1 | 34.5 | 2.8 |
| Com. Ex. 5 | 0 | 64 | 1 | 35 | 0 | 15.7 | 8.0 | 125.6 | 2.0 | 4.2 |
| Com. Ex. 6 | 80 | 0 | 20 | 0 | 0 | 10.8 | 7.6 | 82.1 | 3.0 | 1.7 |

BA: butyl acrylate
BMA: butyl methacrylate
1EG: ethylene glycol dimethacrylate
14EG: tetradecaethylene glycol dimethacrylate
9EG: nonaethylene glycol dimethacrylate Table 1 shows that the resin particles according to Examples 1 to 6 had a multiplication product of the compression strength and the volume average particle diameter in the range of 24.5 to 60.0 (specifically, in the range of 33.9 to 54.6), and a recovery rate in the range of 15% or more and less than 30% (specifically, in the range of 15.7 to 26.7%). Any of the resin particles according to Examples 1 to 6 had an amount of toluene absorbed of 4.5 g/g or less and had an excellent solvent resistance. Particularly, the resin particles of Examples 1 to 3 obtained by using butyl acrylate as the monofunctional (meth)acrylic ester monomer had a recovery rate in the range of 15% or more and 25% or less, had a smaller amount of toluene absorbed than the resin particles according to Examples 4 and 5 obtained by using butyl methacrylate as the monofunctional (meth)acrylic ester monomer, and therefore, had a more excellent solvent resistance. On the other hand, any of the resin particles according to Comparative Examples 1 to 6 exhibited almost the same amount of toluene absorbed as the resin particles according to Examples 1 to 6 and had an excellent solvent resistance, but did not have a recovery rate in the range of 15% or more and less than 30%. Additionally, the resin particles according to Comparative Examples 5 and 6 did not have a multiplication product of the compression strength and volume average particle diameter in the range of 24.5 to 60.0.

In this manner, an excellent solvent resistance is secured in the resin particles according to the present invention, and the resin particles had the properties of soft particles, that is, the properties with a multiplication product between the compression strength and the volume average particle diameter in the range of 24.5 to 60.0 and a recovery rate in the range of 15% or more and less than 30%.

Production of Coating Material

Using each of resin particles obtained in Example 1 to 6 and Comparative Example 1 to 6, various kinds of coating materials containing the respective resin particles obtained in Example 1 to 6 and Comparative Example 1 to 6 were obtained by the following method.

Specifically, 3 parts by weight of the resin particles and 20 parts by weight of a commercially available aqueous resin binder liquid ("U330" manufactured by ALBERDING; 30% by weight of solid content) were mixed for 10 minutes and degassed for 1 minute with a mixing and degassing apparatus to obtain the coating material (coating material composition).

Redispersibility and scratch resistance of the obtained coating material were evaluated by the following evaluation method.

Method for Evaluating Redispersibility

The coating material obtained in Production of Coating material was allowed to stand for 30 days at 30° C., and then shaken by hand. The number of times (the number of times of shaking) at the time when the precipitated resin particles were uniformly dispersed was evaluated by the following evaluation standard.

Good: the number of times of shaking is less than 10.
Fair: the number of times of shaking is 10 or more and less than 20.
Poor: the number of times of shaking is 20 or more.

Production of Coating Film

The coating material obtained in Production of Coating material was applied to one surface of polyester film as a substrate film with a coating apparatus to which a blade with a clearance of 100 μm was set, and dried to form a coating film on the surface of the polyester film.

Method for Evaluating Scratch Resistance

The coating film formed in Production of Coating Film was scratched with a nail a week after the coating film was formed.

The condition of the coating film at this time was evaluated by the following evaluation standard.

Good: no mark (streaks) resulting from a scratch with a nail is left.
Poor: a white mark (streaks) resulting from a scratch with a nail is left.

The following Table 2 shows the production numbers (Examples 1 to 6 and Comparative Examples 1 to 6) of the resin particles used for the production of the coating materials, and the evaluation results of the redispersibility of the coating material containing the resin particles and scratch resistance of the coating film.

TABLE 2

| Production No. of resin particle | Redispersibility | Scratch resistance |
|---|---|---|
| Ex. 1 | Good | Good |
| Ex. 2 | Good | Good |
| Ex. 3 | Good | Good |
| Ex. 4 | Good | Good |
| Ex. 5 | Good | Good |
| Ex. 6 | Good | Good |
| Com. Ex. 1 | Poor | Poor |
| Com. Ex. 2 | Poor | Poor |
| Com. Ex. 3 | Poor | Poor |
| Com. Ex. 4 | Fair | Poor |
| Com. Ex. 5 | Fair | Poor |
| Com. Ex. 6 | Good | Poor |

From the results shown in Table 2, the coating materials containing the resin particles obtained in Examples 1 to 6 had superior redispersibility to those containing the resin particles obtained in Comparative Examples 1 to 5. Moreover, the coating films formed from the coating materials containing the resin particles obtained in Examples 1 to 6 had superior scratch resistance to those formed from the coating materials containing the resin particles obtained in Comparative Examples 1 to 6.

Additionally, the coating films that were formed in Production of Coating Film and contained the resin particles obtained in Examples 1 to 6 had excellent light diffusion properties. Accordingly, a film in which a coating film containing the resin particles obtained in Examples 1 to 6 is formed on at least one surface of a polyester film can be used as an optical film with light diffusion properties.

From the results shown in Table 1 and Table 2, the resin particles according to the present invention have a multiplication product of the compression strength and the volume average particle diameter in the range of 24.5 to 60.0, and a recovery rate in the range of 15% or more to less than 30%. The resin particles of the present invention have an excellent redispersibility when being blended in a coating material composition, and can provide an excellent scratch resistance to a coating film. Moreover, the coating material (coating material composition) containing the resin particles of the present invention is excellent in the redispersibility of the resin particles and the scratch resistance of a coating film formed from the coating material. Furthermore, the coating film formed from the coating material (coating material composition) containing the resin particles of the present invention has excellent light diffusion properties, and a film in which the coating film is formed on at least one surface of a substrate film can be used as an optical film.

Example 7

Production Example of External Preparation

In the present Example 7, a powder foundation including a powder portion and an oil portion was produced. That is, first, the powder portion was prepared by mixing 21 g of the resin particles obtained in Example 1, 38 g of the talc as clay mineral, 22 g of mica as the clay mineral, 6 g of titanium oxide as the coloring material, 0.6 g of red iron oxide as the coloring material, 1 g of yellow iron oxide as the coloring material, and 0.1 g of black iron oxide as the coloring material with a Henschel mixer. The oil portion (without a fragrance) was prepared by mixing and dissolving 10 g of cetyl 2-ethylhexanoate as the fatty acid ester, 1 g of sorbitan sesquioleate as the surfactant, and 0.2 g of the antiseptic.

Next, the oil portion (without a fragrance) was added to the powder portion and uniformly mixed. Furthermore, after 0.1 g of a fragrance was added to the obtained mixture and mixed, the obtained mixture was triturated and sieved. The sieved mixture was subjected to compression molding to obtain a powder foundation as the external preparation. The obtained powder foundation had a soft touch feeling.

In this manner, when being blended in an external preparation, the resin particles according to the present invention was able to provide a soft touch feeling to the external preparation. In other words, the external preparation containing the resin particles according to the present invention had a soft touch feeling.

The invention can be embodied in various other forms without departing from the spirit or essential characteristics thereof. The foregoing embodiments are therefore to be interpreted in all respects as merely illustrative and not restrictive. The scope of the invention is indicated by the appended claims rather than by the foregoing description. Furthermore, all modifications and changes that come within the meaning and range of equivalency of the claims are intended to be embraced therein.

INDUSTRIAL APPLICABILITY

The resin particles of the present invention can be used as, for example, an additive for a coating material (e.g., a flatting agent, softener for a coating film, and agent for imparting design properties), light diffusion agent for an optical film, and material of an external preparation such as cosmetics.

The invention claimed is:

1. Resin particles comprising polymer of a monomer mixture containing
a monofunctional (meth)acrylic ester monomer,
a monomer represented by a general formula (I):

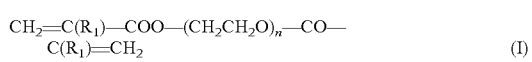
(I)

where $R_1$ is a hydrogen or a methyl group and n is an integer from 1 to 4, and
a monomer represented by a general formula (II):

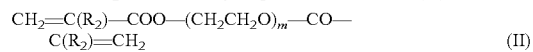
(II)

where $R_2$ is a hydrogen or a methyl group and m is an integer from 5 to 15,
wherein the monomer mixture contains 65.0 to 85.0 parts by weight of the monofunctional (meth)acrylic ester monomer, 0.5 to less than 2.0 parts by weight of the monomer represented by the general formula (I), and 10.0 to 30.0 parts by weight of the monomer represented by the general formula (II) with respect to 100 parts by weight of the total amount of the monofunctional (meth) acrylic ester monomer, the monomer represented by the general formula (I), and the monomer represented by the general formula (II), and
the resin particles have a volume average particle diameter of 5 to 50 μm, a recovery rate of 15% or more and less than 30%, and a compression strength (MPa) at the time of 10% compression deformation that provides a multiplication product in the range of 33.0 to 60.0 obtained by multiplying the compression strength and the volume average particle diameter (μm).

2. The resin particles according to claim 1,
wherein the recovery rate is 15% or more and 25% or less.

3. The resin particles according to claim 1,
wherein the monomer represented by the general formula (I) is ethylene glycol di(meth)acrylate.

4. The resin particles according to claim 1,
wherein m in the general formula (II) is 9 to 14.

5. The resin particles according to claim 1,
further comprising 0.1 to 10 parts by weight of inorganic powder with a primary particle diameter of 1 to 20 nm attached to a surface of the polymer with respect to 100 parts by weight of the total amount of the polymer and the inorganic powder.

6. A method for producing the resin particles according to claim 1, comprising
a step of subjecting the monomer mixture to suspension polymerization in an aqueous medium.

7. A coating material composition comprising the resin particles according to claim 1.

8. An optical film comprising
a substrate film and
a coating film containing the coating material composition according to claim 7, the coating film being formed on at least one surface of the substrate film.

9. An external preparation comprising the resin particles according to claim 1.

* * * * *